(12) United States Patent
Varenne

(10) Patent No.: US 6,426,576 B1
(45) Date of Patent: Jul. 30, 2002

(54) ELECTRIC MACHINE HAVING ROTOR ADAPTED FOR HIGH SPEED

(75) Inventor: Pierre Varenne, Neyruz (CH)

(73) Assignee: Conception et Developpement Michelin S.A. (CH)

( * ) Notice: Subject to any disclaimer, the term of this patent is extended or adjusted under 35 U.S.C. 154(b) by 0 days.

(21) Appl. No.: 09/436,838

(22) Filed: Nov. 9, 1999

(30) Foreign Application Priority Data

Nov. 13, 1998 (FR) .............................................. 98/14442

(51) Int. Cl.⁷ ................................................ H02K 21/12
(52) U.S. Cl. ............................ 310/156.09; 310/156.22; 310/156.61
(58) Field of Search ................................ 310/156, 261, 310/265, 269, 216, 217, 218, 262, 156.01, 156.08, 156.09, 156.11, 156.14, 156.22, 156.48, 156.49, 156.51, 156.52, 156.55, 156.61, 156.63

(56) References Cited

U.S. PATENT DOCUMENTS

| | | | | |
|---|---|---|---|---|
| 1,996,946 A | * | 4/1935 | Beeh | 310/156 |
| 3,663,848 A | * | 5/1972 | Lehoczky | 310/57 |
| 3,979,821 A | * | 9/1976 | Noodleman | 310/156 |
| 4,506,181 A | | 3/1985 | Jones et al. | 310/156 |
| 4,633,113 A | * | 12/1986 | Patel | 310/156 |
| 4,658,165 A | * | 4/1987 | Vanderschaeghe | 310/156 |
| 4,658,167 A | * | 4/1987 | Popov et al. | 310/156 |
| 4,695,754 A | * | 9/1987 | Popov et al. | 310/156 |
| 5,010,266 A | | 4/1991 | Uchida | 310/156 |
| 5,091,668 A | | 2/1992 | Cuenot et al. | 310/156 |
| 5,452,590 A | * | 9/1995 | Vigili | 310/156 |
| 5,554,900 A | * | 9/1996 | Pop, Sr. | 310/156 |
| 5,857,762 A | * | 1/1999 | Schwaller | 310/156 |

* cited by examiner

Primary Examiner—Nestor Ramirez
Assistant Examiner—Dang Dinh Le
(74) Attorney, Agent, or Firm—Baker Botts LLP

(57) ABSTRACT

A rotor for an electric machine which rotor includes a multi-faced shaft, a plurality of pole pieces and permanent magnets carried by the shaft and a plurality of the rods extending between a pair of lateral flanges and passing through the pole pieces between the flanges to retain the pole pieces on the shaft, the pole pieces retaining the magnets on faces of the shaft.

6 Claims, 1 Drawing Sheet

ELECTRIC MACHINE HAVING ROTOR ADAPTED FOR HIGH SPEED

BACKGROUND OF INVENTION

The invention relates to an electric machine having a rotor which carries permanent magnets, and more precisely, a rotor in which the magnets are retained within recesses of the rotor. The electric machines in question are commonly described as having "embedded magnets." This rotor arrangement principle is widely applied for automatic synchronous machines with flux concentration.

The size of a rotating electric machine of this type depends on its rated load torque. The greater the torque that a motor is capable of delivering, the more voluminous the electric motor, everything else being equal. There are, however, applications for which it is desirable to attain both high power and great compactness of the motor. To give simply one concrete example, when it is sought to install electric traction motors in the wheels of motor vehicles, it is desirable to be able to develop power equal to at least 10 kW per motor and even, more often, at least 25 or 30 kW per motor for as low a weight as possible in order not to overload unsprung weights. It is also desirable for the space occupied to be very compact, exceeding the interior volume of the wheel as little as possible in order not to interfere with the clearances of the parts of the vehicle in suspension movements and with other types of motion of the wheel relative to the body of the vehicle.

Those two imperatives (high power and reduced weight and space) make highly problematical the installation of electric traction motors in the wheels of passenger vehicles, except to radically improve the weight/power ratio of the electric machines currently available on the market.

The choice of a high speed for an electric motor is a solution which makes possible, at given power, to reduce the torque and therefore the space required. In other words, for a given motor rating, the greater its rated speed of rotation, the less the space it requires. But raising the speed of rotation of a rotating electric machine poses numerous problems of mechanical performance that are especially difficult to solve, if it is desired to limit the weight and the space occupied by said rotating electric machine as much as possible.

SUMMARY OF THE INVENTION

The object of the invention is to propose a rotating electric machine design which makes it possible to attain high speeds of rotation, at least up to 12,000 revolutions per minute, for example, without encountering any problem either of torque transmission or of rotor centrifugation.

According to the invention, the rotating electric machine, having an outer casing forming a support structure for a stator, has a rotor comprising:

a shaft made in a single piece of nonmagnetic material mounted by means of bearings on the outer casing, said bearings defining an axis of rotation of said shaft;

an assembly embodying a plurality of pole pieces and permanent magnets surrounding the shaft, the pole pieces defining between them chambers extending from the surface of the shaft to an air gap between rotor and stator, said chambers containing said permanent magnets;

a lateral flange mounted axially at each end of said shaft;

tie rods connecting the lateral flanges passing through each pole piece and enclosing each pole piece between the lateral flanges, in which said shaft, seen in section perpendicular to the axis of rotation, forms a convex noncircular figure, cooperating with said assembly to immobilize it in relative rotation on said shaft.

The configuration of the shaft makes possible a torque transmission direct from the pole pieces to the shaft, at least in localized fashion or preferably over the whole axial length of the pole pieces. The shaft, seen in section perpendicular to the axis of rotation, preferably forms a regular convex polygon, containing plane facets separated by edges. Each pole piece, seen in section perpendicular to the axis of rotation, then presents generally radial edges opposite the magnets and, opposite the shaft, forms a reenterant angle designed to center said pole piece on one of the edges of the shaft. A hexagonal polygon is particularly favorable to torque passage from the pole pieces to the shaft, while ensuring good compactness of the shaft.

DESCRIPTION OF THE DRAWING

The invention will be better understood by the description of an nonlimitive example, referring to the attached drawing in which.

DESCRIPTION OF PREFERRED EMBODIMENTS

Figure 1:
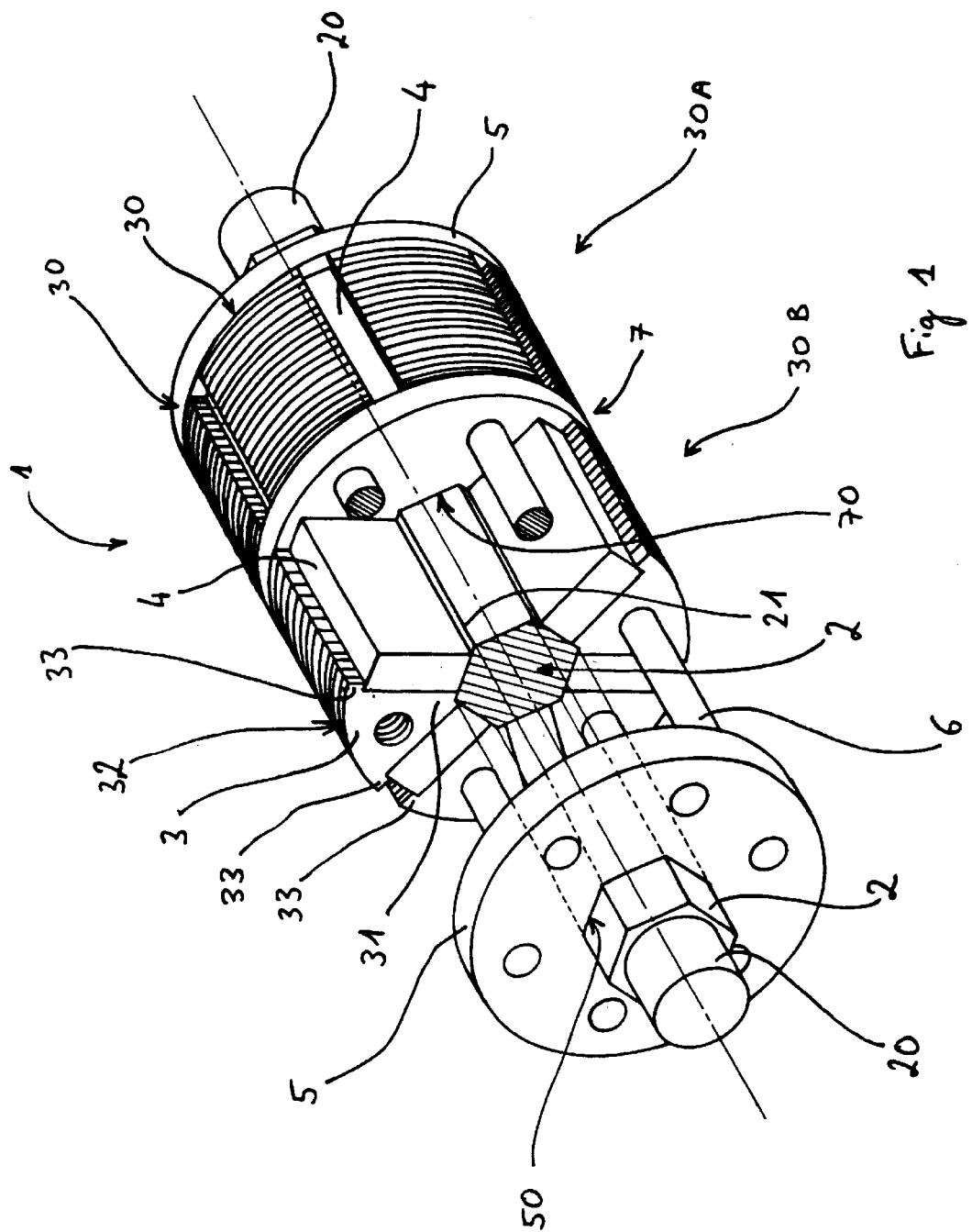
FIG. 1 is a perspective showing the rotor of a motor according to the invention.

The drawing shows a hexapolar machine in which the rotor 1, the shaft 2 and the position of the bearings 20 can be seen. Ferromagnetic sheets 3 assembled in six pole pieces 30 are visible. Each sheet is roughly perpendicular to the axis of the shaft. The invention can also be used with solid pole pieces. On both ends of the shaft 2, axially, a lateral flange 5 (preferably of nonmagnetic material) is situated on each side of the assembly of pole pieces 30. Each lateral flange 5 has a central recess, the shape of which is adjusted to that of the shaft 2. One tie rod 6 per pole piece 30 crosses through each stack of sheets 3 and makes it possible to retain between the flanges 5. Permanent magnets 4 are placed in the housings between the pole pieces 30. The radially outer side 32 of each sheet 3 is an arc of a circle centered on the axis of the rotor. Flanking that side 32, two small lugs 33 retain the magnets 4 against centrifugal force. Furthermore, the magnets are glued in their housing.

The tie rods 6 transfer the stresses due to the centrifugal force on the lateral flanges 5. The latter being perfectly integral with the shaft 2 by their design in a single piece crossed by and adjusted on said shaft 2; holding of all the parts of the rotor on centrifugation is therefore assured. In that arrangement the tie rods 6 oppose the centrifugal force that the magnets 4 exert on the sheets 3 of each pole piece and the centrifugal force that the sheets 3 themselves undergo (the effect due to friction between each sheet as well as gluing of the magnets 4 on the shaft 2 being overlooked). The air gap between the rotor 1 and the stator (not) shown should also be as small as possible in order to keep the reluctance of the magnetic circuit as low as possible. Low reluctance makes it possible to use smaller magnets for a given rated torque level. Due to that arrangement, the shaft 2 is very compact, for it does not contain any dovetail or similar arrangement intended to retain the pole pieces and/or magnets when subjected to centrifugation.

To perfect the strength of the sheets during centrifugation, it is possible to use one or more intermediate flanges 7. The latter are preferably of nonmagnetic material. That limits sheet displacements at the cost of a slight increase in axial length of the inactive rotor in order to develop a flux in the air gap. It makes it possible to lengthen the rotor, if necessary, by multiplying the number of intermediate flanges, while guaranteeing that the small air gap remains compatible with very high speeds of rotation.

Each pole piece 30 is thus divided into several sectors 30A, 30B . . . aligned axially and separated by an intermediate flange 7, preferably of nonmagnetic material, each intermediate flange 7 having a central recess of shape complementary to that of the shaft. The intermediate flange 7 can, on mounting, be very easily attached on the shaft 2. Each intermediate flange 7 is, just like the lateral flanges 5, perfectly integral with the shaft 2 by its design in a single piece crossed by and adjusted on said shaft 2. Each intermediate flange 7 therefore contributes to resisting the displacements that centrifugation could cause at very high speeds of rotation. Each intermediate flange is transversed by at least one of said tie rods 6 per pole piece.

Transmission of the torque is secured by the flat bearings provided by the convex polygonal shape of the shaft, said flat bearings cooperating with facets arranged on said assembly in order to immobilize it in relative rotation on said shaft. In this way, the torque is directly transmitted between the pole pieces and the shaft. Said convex polygonal shape preferably extends over a great length of the shaft 2. It can be seen in the example illustrating the invention that the shaft contains a convex polygonal bearing also opposite each intermediate flange 7, cooperating with facets of complementary shape provided on the central recess 70 of each of the intermediate flanges 7 in order to immobilize it in relative rotation on said shaft. In addition, the shaft contains a convex polygonal bearing also opposite each lateral flange 5, cooperating with facets of complementary shape arranged on the central recess 50 of each of the lateral flanges 5 in order to immobilize it in relative rotation on said shaft.

The shaft preferably presents an identical section (polygonal here) at any axial position between the lateral flanges 5 and opposite the latter, which maximizes the useful length on transmission of torque. The shaft is of hexagonal section here over almost the total axial length between the bearings 20. The sheet assembly as well as the lateral and intermediate flanges contribute to transmission of the torque to the shaft, which reduces the stresses in said flanges. Let us further note that the polygon design of the shaft and the shape of the base of the sheets which follow one another facilitate mounting of the motor by an easy indexing of the sheets on the shaft.

That arrangement of the shaft in polygonal section, therefore presenting plane facets, is in itself very useful in reducing as much as possible the radial space occupied by the rotor. In fact, in that way, the bottom of the housing of each of the magnets 4 is flat. That make it possible to insert parallelepipedal magnets without loss of space. The permanent magnets 4 are in direct contact on the shaft 2; the latter consists of a single piece; each magnet bears on one of the flat faces of the polygon. That design principle requires the shaft to be of nonmagnetic material in order for the shaft not to create any magnetic short circuit. Each sheet of a pole piece presents a section perpendicular to the axis of rotation having a triangular general course, the apex 31 of which is formed to be exactly centered on one of the six edges 21 of the shaft 2.

In order to further improve the compactness of the motor, it can be arranged for the stator to contain a duct for the circulation of a cooling liquid, for example, a coolant of the type used for cooling heat engines of motor vehicles. Of course, alternators can be built in the same way.

I claim:

1. A rotor for an electric machine, said rotor comprising:

a shaft made in a single piece of nonmagnetic material for mounting the rotor for rotation about an axis, said shaft, seen in section perpendicular to the axis of rotation, having a convex polygonal cross section containing plane faces separated by edges;

an assembly which includes a plurality of pole pieces and permanent magnets carried by the shaft, the pole pieces extending the entire radial height between the shaft and an air gap and defining chambers between them, said chambers accommodating the full length of said permanent magnets, each permanent magnet being in direct contact with one of said plane faces of said nonmagnetic shaft, and each pole piece, seen in section perpendicular to the axis of rotation, being located between adjacent magnets and having substantially radially extending sides opposite to said adjacent magnets and a radially inner end defining a reentrant angle which centers the pole piece on the opposite edge of the nonmagnetic shaft;

a lateral flange at each axial end of the shaft; and tie rods connecting the flanges and passing through each pole piece mounting each pole piece between the lateral flanges.

2. A rotor according to claim 1, in which said assembly includes parallelepipedal magnets in direct contact with the plane faces of the shaft.

3. A rotor according to claim 1, in which the shaft has an identical section at any axial location along its length between the lateral flanges.

4. A rotor according to claim 1, in which each pole piece comprises a stack of ferromagnetic sheets, each sheet being substantially perpendicular to the axis of the shaft.

5. A rotor according to claim 1, containing at least one intermediate flange, each pole piece being divided into several sectors aligned axially and separated by an intermediate flange, the shaft passing through each intermediate flange through a central recess, each intermediate flange being crossed by at least one of said tie rods.

6. A rotor according to claim 1, in which each pole piece comprises at the radially outer end of each radially extending side thereof a lug which overlies the radially outer end of the adjacent magnet to retain said adjacent magnet against centrifugal force.

* * * * *